United States Patent
Tanaka

(10) Patent No.: US 8,953,221 B2
(45) Date of Patent: Feb. 10, 2015

(54) IMAGE FORMING APPARATUS, IMAGE FORMING SYSTEM, AND CONTROL METHOD FOR SPECIFYING COLOR NAMES OF SHEETS

(75) Inventor: Hirotomo Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 13/282,024

(22) Filed: Oct. 26, 2011

(65) Prior Publication Data
US 2012/0105879 A1    May 3, 2012

(30) Foreign Application Priority Data
Nov. 1, 2010 (JP) ................. 2010-245704

(51) Int. Cl.
*H04N 1/60* (2006.01)
*H04N 1/00* (2006.01)
*H04N 1/23* (2006.01)

(52) U.S. Cl.
CPC ........... *H04N 1/6033* (2013.01); *H04N 1/6047* (2013.01); *H04N 1/605* (2013.01); *H04N 1/00408* (2013.01); *H04N 1/00482* (2013.01); *H04N 1/2338* (2013.01); *H04N 1/2353* (2013.01)
USPC .......................................................... 358/1.9

(58) Field of Classification Search
CPC ............................ H04N 1/605; H04N 1/6047
USPC ............................................ 358/1.9; 345/594
See application file for complete search history.

(56) References Cited

U.S. PATENT DOCUMENTS

| | | | |
|---|---|---|---|
| 6,654,138 B1 * | 11/2003 | Yoshida | 358/1.15 |
| 8,014,008 B2 * | 9/2011 | Yamakawa | 358/1.14 |
| 8,294,939 B2 * | 10/2012 | Fujimori et al. | 358/1.15 |
| 8,711,409 B2 * | 4/2014 | Kamata | 358/1.15 |
| 2002/0051180 A1 * | 5/2002 | Shimbori et al. | 358/1.15 |
| 2002/0090240 A1 * | 7/2002 | Lively | 400/76 |
| 2003/0063315 A1 * | 4/2003 | Nunokawa | 358/1.16 |
| 2004/0065815 A1 * | 4/2004 | Luxem et al. | 250/226 |
| 2006/0001677 A1 * | 1/2006 | Webb et al. | 345/594 |
| 2007/0203905 A1 * | 8/2007 | Mestha et al. | 707/5 |
| 2007/0205256 A1 * | 9/2007 | Uno et al. | 235/375 |
| 2008/0266607 A1 * | 10/2008 | Morita | 358/1.18 |
| 2009/0080009 A1 * | 3/2009 | Takahashi et al. | 358/1.9 |
| 2009/0146363 A1 * | 6/2009 | Hosoi | 271/9.01 |
| 2009/0147295 A1 * | 6/2009 | Pandit et al. | 358/1.15 |
| 2011/0013210 A1 * | 1/2011 | Yamaguchi | 358/1.9 |

(Continued)

FOREIGN PATENT DOCUMENTS

JP    2002-193465 A       7/2002
JP    2012098478 A    *  5/2012    ............ G03G 21/00

*Primary Examiner* — Vincent Rudolph
*Assistant Examiner* — Edwin S Leland, III
(74) *Attorney, Agent, or Firm* — Carter, DeLuca, Farrell & Schmidt, LLP

(57) ABSTRACT

The present invention prevents a printing result desired by a user from being unable to be printed out, due to registration of the same color name for sheets of different colors. To accomplish this, an image forming apparatus includes a reading unit that reads in a sheet; a generating unit that generates color data indicating a color of the sheet read by the reading unit; an obtaining unit that obtains a color name corresponding to the color data generated with the generating unit, by searching a color sample database, wherein color data and color names corresponding to the color data are stored in the color sample database; and a setting unit that sets a sheet feed cassette to the color name obtained by the obtaining unit.

7 Claims, 13 Drawing Sheets

(56) References Cited

U.S. PATENT DOCUMENTS

| | | | |
|---|---|---|---|
| 2012/0105879 A1* | 5/2012 | Tanaka | 358/1.9 |
| 2012/0224204 A1* | 9/2012 | Yamagishi | 358/1.13 |
| 2013/0182270 A1* | 7/2013 | Inui | 358/1.9 |
| 2014/0029055 A1* | 1/2014 | Shimura | 358/1.16 |

* cited by examiner

FIG. 5

SET SHEETS

SHEET INFORMATION

| NAME | SHEET SIZE | TYPE | COLOR NAME | CIELAB | GRAMMAGE |
|---|---|---|---|---|---|
| ○○PAPER | A3 | COLORED PAPER | PANTONE #609 30% | L80 a30 b50 | 100gsm |
| ○×PAPER ** | A4 | PLAIN PAPER 1 | PANTONE #706 10% | L98 a20 b50 | 108gsm |
| ××PAPER | A4 | OHP | TRANSPARENT | | |
| △△PAPER | LTR | PLAIN PAPER 1 | PANTONE #706 10% | L98 a20 b50 | 100gsm |

[DETAILS / EDIT]  [COPY]  [DELETE]

[OK]  [CANCEL]  [HELP]

FIG. 6

SET SHEETS

SHEET INFORMATION

| NAME | SHEET SIZE | TYPE | COLOR NAME | CIELAB | GRAMMAGE |
|---|---|---|---|---|---|
| ○○PAPER | A4 | COLORED PAPER | PANTONE #609 30% | L80 a30 b50 | 100gsm |
| ○×PAPER ** | A3 | PLAIN PAPER 1 | PANTONE #706 10% | L98 a20 b50 | 108gsm |
| ××PAPER | A4 | OHP | TRANSPARENT | | |
| △△PAPER | LTR | PLAIN PAPER 1 | PANTONE #706 10% | L98 a20 b50 | 100gsm |

DETAILS / EDIT  COPY  DELETE

OK  CANCEL  HELP

FIG. 7

DETAILS / EDIT

| | | |
|---|---|---|
| NAME | TEST 01 | CHANGE |
| TYPE | USER-DEFINED SHEET | CHANGE |
| GRAMMAGE | 93g/m² | CHANGE |
| FEATURES | NONE | CHANGE |
| SURFACE PROPERTIES | HIGH-QUALITY PAPER | CHANGE |
| CREEP (MISALIGNMENT) CORRECTION AMOUNT | 0mm | READ — 701 |
| COLOR | | |

▼ 1/2 ▲

OK    CANCEL    HELP

700

IMAGE FORMING APPARATUS, IMAGE FORMING SYSTEM, AND CONTROL METHOD FOR SPECIFYING COLOR NAMES OF SHEETS

BACKGROUND OF THE INVENTION

1. Field of the Invention

The present invention relates to image forming apparatuses, image forming systems, and control programs.

2. Description of the Related Art

Conventionally, there are image forming apparatuses, which let the user specify the color of the sheet that is used for printing, and perform the printing while feeding sheets from a sheet feed cassette in which sheets of the color specified by the user have been set (Japanese Patent Laid-Open No. 2002-193465).

In this Japanese Patent Laid-Open No. 2002-193465, the color of the sheets is registered in advance for each cassette tray of the image forming apparatus. After this, if a cassette tray of the image forming apparatus is already set to the color of the sheet specified by the user, then the sheets of this cassette tray are used for printing. If the sheet size or color does not match, then a search is performed on the cassette trays that have not yet been subjected to a search, and if there is no cassette tray corresponding to the specified size and color, then a message is output indicating that there are no sheets. With Japanese Patent Laid-Open No. 2002-193465, the user can print while feeding paper of the desired color to the image forming apparatus, by specifying the sheet colors blue or pink from a driver.

Moreover, conventional image forming apparatuses may include a sheet type database, in which various types of settings for sheets are stored. In this sheet type database, setting parameters that are necessary for printing (such as sheet size or grammage, for example) are collected for each type of sheet. The image forming apparatus can handle any sheet selected by the user from this sheet type database. In this sheet type database, data that corresponds to sheets sold by paper manufacturers is prepared in advance as the various settings that are necessary for printing. The user can print by selecting the suitable data from the paper type database and setting the cassette trays. The setting parameters in the sheet type database include the parameter of sheet color, and by registering the sheets in advance in the sheet type database, the user can confirm the color of the sheets. For example, at the time of printing, the user can specify, with an operating panel, any of the colors (white, blue, cream, bright yellow, grey, green, ivory, orange, pink, red, yellow, transparent, etc.) that have been prepared in advance when registering the sheets.

However, in conventional image forming apparatuses, it may occur that the printing result that is desired by the user is not output when the same color name is registered for sheets of different colors.

For example, user A may register sheets of a dark yellow color in a sheet feed cassette as "yellow" and user B may register sheets of a light yellow color in another sheet feed cassette as "yellow".

Let us assume that then, user A issues a print instruction specifying "yellow" in order to let the image forming apparatus feed the dark yellow sheets. In this case, the image forming apparatus searches a sheet feed cassette set to "yellow" to feed the sheets therein, but at that time, it is determined that the sheet feed cassette in which user B has set the light yellow sheets matches this condition, and sheets may wind up being fed from that sheet feed cassette. As a result, the light yellow sheets, which were not intended by user A, may be unintentionally used for printing.

Moreover, there are image forming apparatuses that switch the sheet feed cassette to be used, if the number of sheets in the sheet feed cassette is insufficient. Such an image forming apparatus may feed sheets from the sheet feed cassette in which dark yellow sheets are registered as "yellow" and if this sheet feed cassette runs out of sheets, light yellow sheets may be fed from another sheet feed cassette that is also registered as "yellow". In this case, the color of the print-out will change underway.

SUMMARY OF THE INVENTION

The present invention enables realization of a configuration that prevents a printing result desired by a user from being unable to be printed out, due to registration of the same color name for sheets of different colors.

One aspect of the present invention provides an image forming apparatus comprising: a reading unit that reads in a sheet; a generating unit that generates color data indicating a color of the sheet read by the reading unit; an obtaining unit that obtains a color name corresponding to the color data generated with the generating unit, by searching a color sample database, wherein color data and color names corresponding to the color data are stored in the color sample database; and a setting unit that sets a sheet feed cassette to the color name obtained by the obtaining unit.

Another aspect of the present invention provides an image forming apparatus comprising: a reading unit that reads in a sheet; a generating unit that generates color data indicating a color of the sheet read by the reading unit; an obtaining unit that, if there is a sheet feed cassette set to a color name corresponding to the color data generated by the generating unit, obtains the color name to which that sheet feed cassette is set; and a setting unit that sets the sheet feed cassette to the color name obtained by the obtaining unit.

Still another aspect of the present invention provides an image forming system comprising an information processing apparatus and an image forming apparatus that prints in response to a print instruction from the information processing apparatus, the image forming system comprising: a reading unit of the image forming apparatus, the reading unit reading in a sheet; a generating unit of the image forming apparatus, the generating unit generating color data indicating a color of the sheet read by the reading unit; an obtaining unit of the image forming apparatus, the obtaining unit obtaining a color name corresponding to the color data generated by the generating unit, by searching a color sample database, wherein color data and color names corresponding to the color data are stored in the color sample database; a setting unit of the image forming apparatus, the setting unit setting a sheet feed cassette to the color name obtained by the obtaining unit; a print instruction unit of the information processing apparatus, the print instruction unit, in response to a user specifying a feed sheet cassette set to the color name and giving a print instruction, giving a print instruction including specification of a sheet feed cassette to the image forming apparatus; and a printing unit of the image forming apparatus, the printing unit performing printing using the sheets accommodated in the specified sheet feed cassette, in response to the print instruction from the information processing apparatus.

Yet still another aspect of the present invention provides an image forming system comprising an information processing apparatus and an image forming apparatus that prints in response to a print instruction from the information processing apparatus, the image forming system comprising: a reading unit of the image forming apparatus, the reading unit reading in a sheet; a generating unit of the image forming apparatus, the generating unit generating color data indicating a color of the sheet read by the reading unit; an obtaining unit of the image forming apparatus, wherein, if there is a sheet feed cassette set to a color name corresponding to the color data generated by the generating unit, the obtaining unit obtains the color name to which that sheet feed cassette is set; a setting unit of the image forming apparatus, the setting unit setting a sheet feed cassette to the color name obtained by the obtaining unit; a print instruction unit of the information processing apparatus, wherein, in response to a user specifying a feed sheet cassette set to the color name and giving a print instruction, the print instruction unit gives a print instruction including specification of the sheet feed cassette to the image forming apparatus; and a printing unit of the image forming apparatus, the printing unit performing printing using the sheets accommodated in the specified sheet feed cassette, in response to the print instruction from the information processing apparatus.

Still yet another aspect of the present invention provides a control method for controlling an image forming apparatus, the method comprising a reading unit of the image forming apparatus reading in a sheet; a generating unit of the image forming apparatus generating color data indicating a color of the sheet read in the reading step; an obtaining unit of the image forming apparatus obtaining a color name corresponding to the color data generated in the generation step, by searching a color sample database, wherein color data and color names corresponding to the color data are stored in the color sample database; and a setting unit of the image forming apparatus setting a sheet feed cassette to the color name obtained in the obtaining step.

Yet still another aspect of the present invention provides a control method for controlling an image forming apparatus, the method comprising a reading unit of the image forming apparatus reading in a sheet; a generating unit of the image forming apparatus generating color data indicating a color of the sheet read in the reading step; if there is a sheet feed cassette set to a color name corresponding to the color data generated in the generating step, an obtaining unit of the image forming apparatus obtaining the color name to which that sheet feed cassette is set; and a setting unit of the image forming apparatus setting the sheet feed cassette to the color name obtained in the obtaining step.

Still yet another aspect of the present invention provides a computer-readable storage medium storing a computer program that causes a computer to function as the units of the image forming apparatus.

Further features of the present invention will be apparent from the following description of exemplary embodiments with reference to the attached drawings.

BRIEF DESCRIPTION OF THE DRAWINGS

FIG. 5 is a diagram showing a sheet information display screen.

FIG. 6 is a diagram showing a sheet type management screen.

FIG. 7 is a diagram showing a sheet data details editing screen.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In this embodiment, the user lets an image forming apparatus read in a sheet that the user wants to register, and the image forming apparatus automatically specifies a suitable color name of the sheet that has been read in and registers this color name in the sheet type database. The following is an explanation of the process up to the printing with the image forming apparatus after the user has specified the color name registered in the sheet type database from a driver.

<System Configuration (FIG. 1)>

Figure 1:
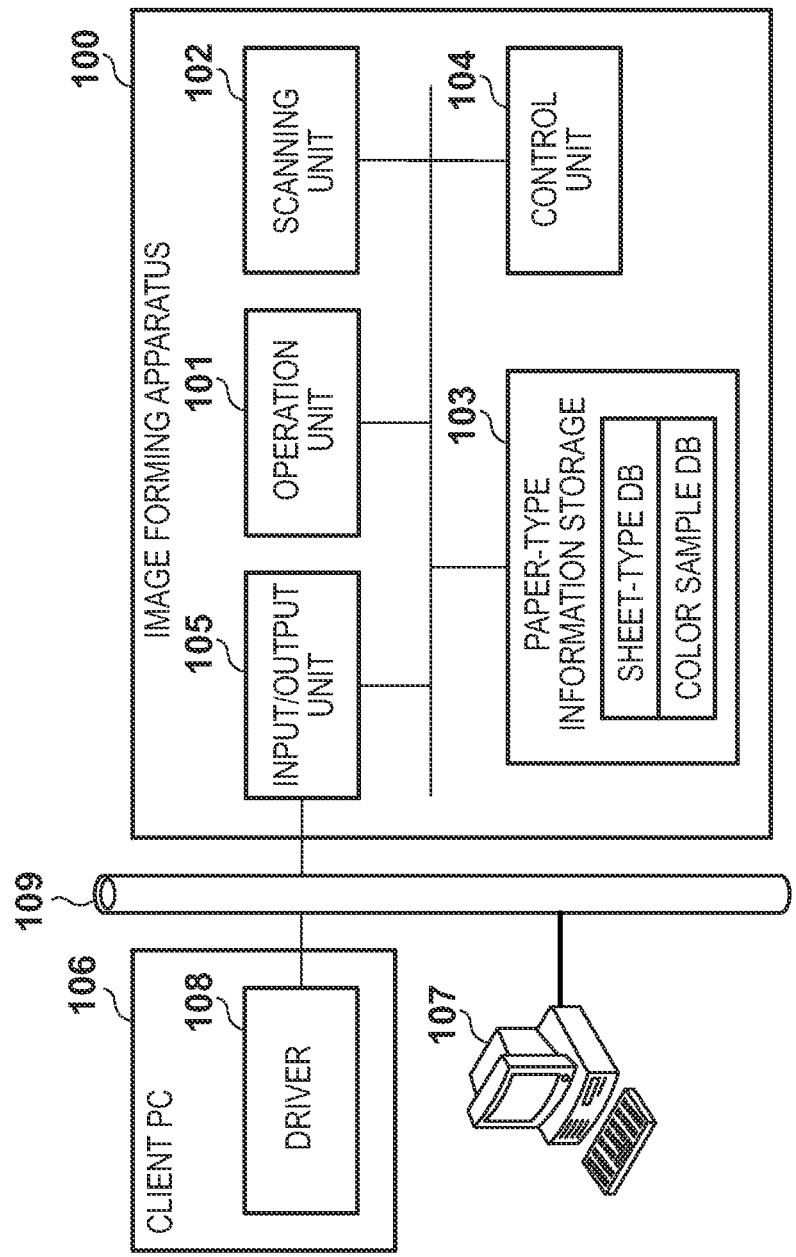
FIG. 1 is a block diagram showing the configuration of an image forming system.

FIG. 1 is a block diagram showing the configuration of an image forming system according to this embodiment. The image forming system according to this embodiment includes client PCs 106 and 107 (information processing apparatuses), and an image forming apparatus 100. These are connected to each other via a network 109.

The client PCs 106 and 107 have a driver 108 for executing print instructions, including various settings, on the image forming apparatus 100. The driver 108 outputs PDL data, such as universal PostScript (referred to as "PS" below) data, as a print job. At this time, the image forming apparatus according to this embodiment is able to accept also PDL data that is input from a variety of drivers.

The image forming apparatus 100 includes an operation unit 101, a scanning unit (reading unit) 102, a paper-type information storage 103, a control unit 104 and an input/output unit 105. The operation unit 101 is for inputting/outputting information from/for the user into/from the image forming apparatus, and includes a UI (user interface) for letting the user input the name of the paper type, to indicate the sheet type, or confirm the color of the sheet. The read-in portion 102 is constituted by a scanner unit, which performs input from a top board, input using a sheet feeder and input of color data from a spectral sensor installed in a trunk portion.

The paper-type information storage 103 includes the sheet type database (in the following referred to as "sheet type DB"), and a color sample database (in the following referred to as "color sample DB"). In the sheet type DB, a color name is given to each type of sheet, and the sheet type DB comprehensively manages the settings that are necessary for printing (such as sheet size and grammage, for example), in association with the respective color names. The data corresponding to the sheets sold by paper manufacturers are provided in the sheet type DB. By setting the respective data for a plurality of cassette trays (sheet feed cassettes), the user can use the sheet that is necessary for printing with the image forming apparatus. Among the setting parameters in this sheet type DB, there is the parameter "color name", and in the present embodiment, it further includes color data.

The color sample DB contains a color sample book in which the basic colors in the print market are listed, in association with the corresponding CIE Lab (L*a*b color system) values, and is used when selecting a color name from CIE Lab. The following explanation uses the data of the color sample book by PANTONE, Inc. The PANTONE color sample book lists color numbers and densities as percentages, and is widely used in the printing industry as a method for specifying colors. It should be noted that in the present embodiment, a plurality of colors are expressed by the densities for each color in the L*a*b color system, but it is also possible to express them using the RGB color system.

The control unit 104 compares the color data of the sheet that has been read in by the scanning unit 102 in view of a certain feature amount with the color data of the paper-type information storage 103, and includes a similarity determination unit that determines whether the two are similar. Via the network 109, the input/output unit 105 receives a print job that has been input from the driver 108. Moreover, the input unit 105 has the function of sending the sheet information set by the paper-type information storage 103 to the driver.

<Consumable Management Screen (FIG. 2)>

Figure 2:
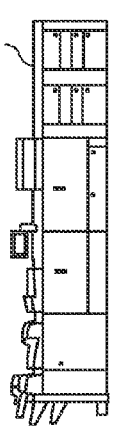
FIG. 2 is a diagram showing a consumable confirmation screen.
Figure 3:
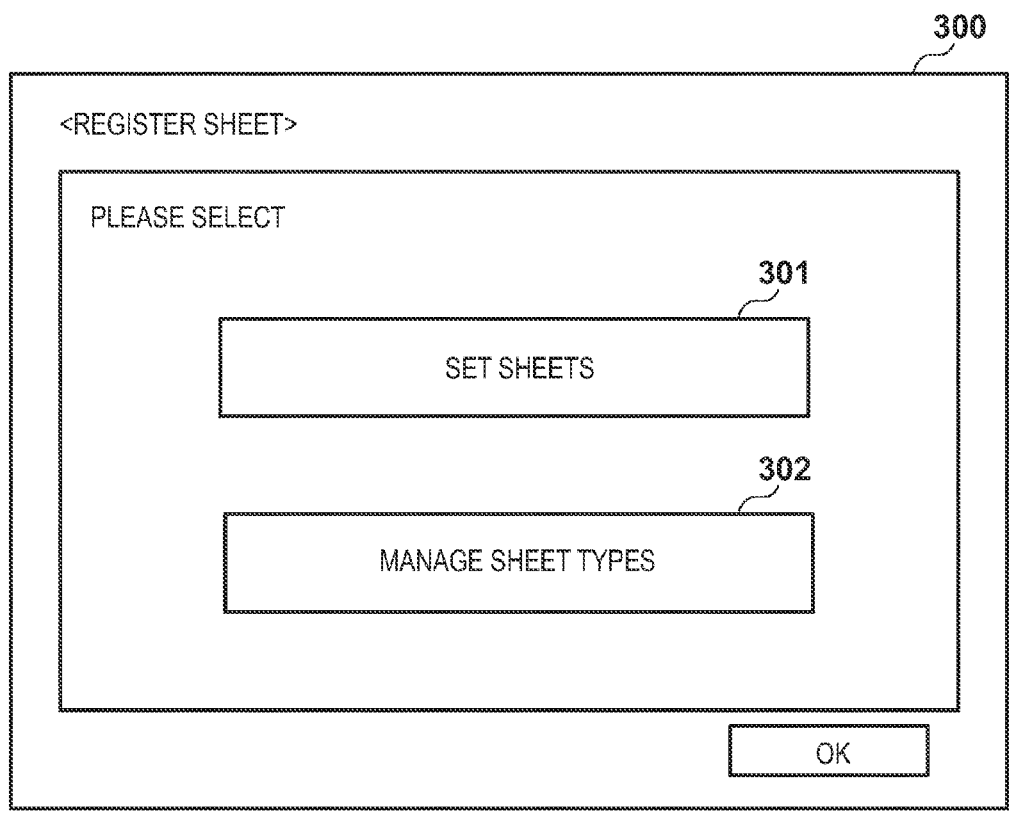
FIG. 3 is a diagram showing a selection screen for registering/setting sheets.

FIG. 2 shows a management screen 200 for consumables, such as the cassette trays of the image forming apparatus, that is displayed on the operation unit 101 of the image forming apparatus. This consumable management screen 200 includes cassette tray information 202, a device status 203 and other information 204. The cassette tray information 202 indicates which type of sheet is set in the individual cassette trays of the image forming apparatus. If a user has selected one of the cassette trays from the cassette tray information 202, the device status 203 clearly indicates where that cassette tray is located in an image of the image forming apparatus. The other information 204 is information that indicates the remaining amount of toner or staples for the stapler. When the user presses a "register sheets" button 205, the operation unit 101 displays a sheet registration screen 300 as shown in FIG. 3.

<Sheet Registration Screen (FIG. 3)>

In order to print with the image forming apparatus, it is necessary to register and manage information on the sheets in the sheet type DB stored in the paper-type information storage 103, and assign the managed sheets to the cassette trays. FIG. 3 is a screen providing the user with a choice to perform settings with one of two procedures. The operation unit 101 changes the displayed screen depending on whether the "set sheets" button 301 or the "manage sheet types" button 302 has been pressed.

<Management Screen for Sheet Type DB (FIGS. 6, 7)>

When the "manage sheet types" button 302 in the sheet registration sheet in FIG. 3 is pressed, the management screen 600 of the sheet type DB shown in FIG. 6 is displayed on the operation unit 101. The sheet information 601 contains the parameters necessary for printing, such as sheet name, sheet size, color name, color data, grammage and surface characteristics. The data corresponding to the sheets sold by paper manufacturers are provided in advance in the sheet type DB. Furthermore, when the user selects the desired sheet and presses a "copy" button 603, then this sheet data is copied, and by customizing the copied sheet data, the user can register new sheet data. Then, when the user presses a "details/edit" button 602 after selecting the desired sheet type from the list in the sheet information 601, a details editing screen 700 for editing the details of the sheets, as shown in FIG. 7, is displayed on the operation unit 101. Then, when the user presses the "OK" button after editing the details, the control unit 104 registers this information in the sheet type DB.

<Setting Screen for Cassette Tray and Sheet (FIGS. 4, 5)>

Figure 4:
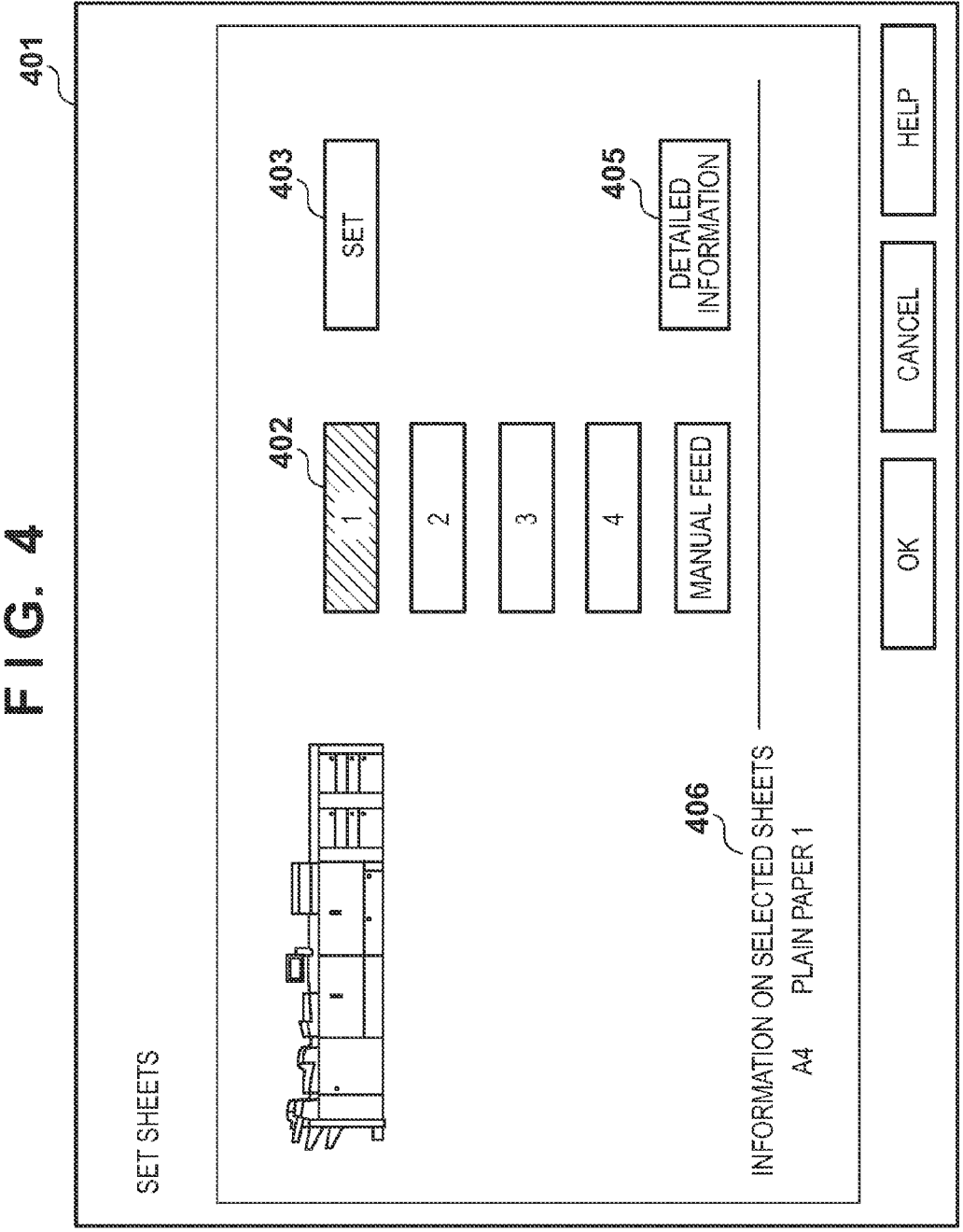
FIG. 4 is a diagram showing a setting screen for sheets.

When the "set sheets" button 301 on the sheet registration screen shown in FIG. 3 is pressed, the setting screen for the cassette trays shown in FIG. 4 is displayed on the operation unit 101. The number of cassette trays for paper supply differs depending on the optional configuration of the image forming apparatus. The operation unit 101 switches its display depending on the optional configuration; here, buttons 402 are displayed that correspond to cassette trays at five locations, including a manual paper feed. When the user selects the button of the desired cassette tray, the sheet information 406 set for the selected cassette tray is displayed in a lower region of the screen. For example, in FIG. 4, the button of the cassette tray 1 is selected, and the field for the sheet information 406 displays that the sheet size "A4" and the sheet type "plain paper 1" have been set for the cassette tray 1.

To change the sheets to which the cassette tray is set, the cassette tray to be changed is selected, and the setting button 403 on the upper right of the screen is pressed. When this setting button 403 is pressed, a sheet setting screen 500 as shown in FIG. 5 is displayed on the operation unit 101. The sheet information 501 displayed in the middle of the screen is the information in the sheet type DB. The sheet information 501 includes such information as sheet name, sheet size, type, color name, color data and grammage. Moreover, the two asterisks "**" in the column "name" of the sheets indicate sheets to which the cassette trays are presently set. For example, in FIG. 5, it is displayed that the cassette tray 1 is set to sheets of "ox paper". To change the sheets to which the cassette tray is set, the user selects the name of the sheets to be set, and can change the sheets by pressing the "OK" button 605. If the present settings are suitable, the "cancel" button may be pressed. Thus, the control unit 104 sets the cassette tray to the sheets selected in accordance with the user input.

<Driver Printing Setting Screen (FIG. 10)>

Figure 10:
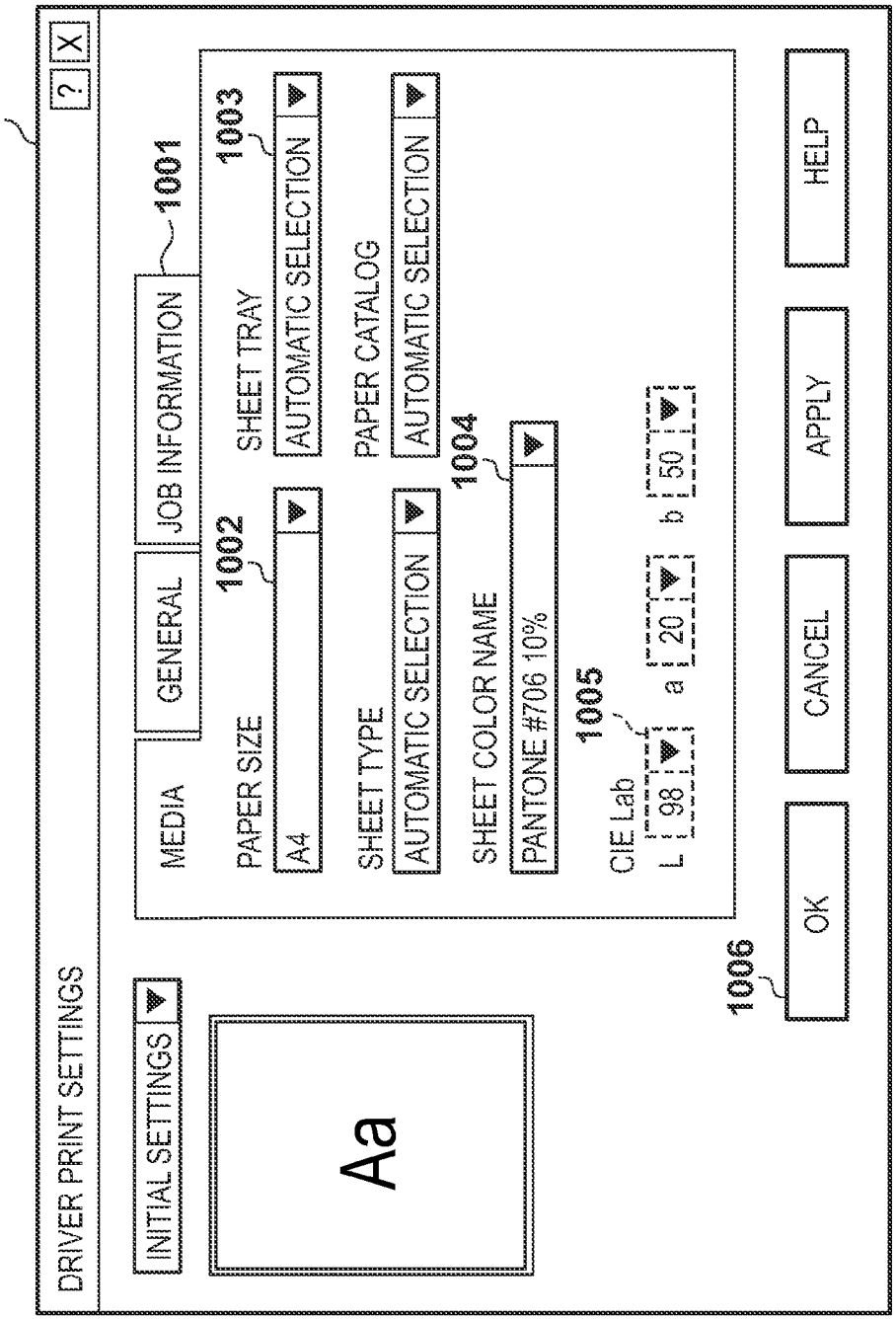
FIG. 10 is a diagram showing a driver screen.

FIG. 10 is a drawing indicating a print setting screen displayed by the driver 108 installed on the client PCs 106 and 107. The driver 108 installed on the client PCs performs bidirectional communication with the sheet type DB, and can reflect newly registered sheet data in the sheet type DB by selecting it with the driver. In the present embodiment, the driver is provided with sheet color parameters 1004, which were not present in conventional drivers, and these sheet color parameters 1004 can be selected. In order to make the displayed options easy to grasp for the user, the values of the PANTONE color sample book are used for this. When the user selects one of the options, the CIE Lab parameters 1005 are displayed as the color data. The user can select a candidate from the driver, based on the color name of the sheet when it was registered in the sheet settings.

<Color Registration Procedure (FIG. 11)>

Figure 11:
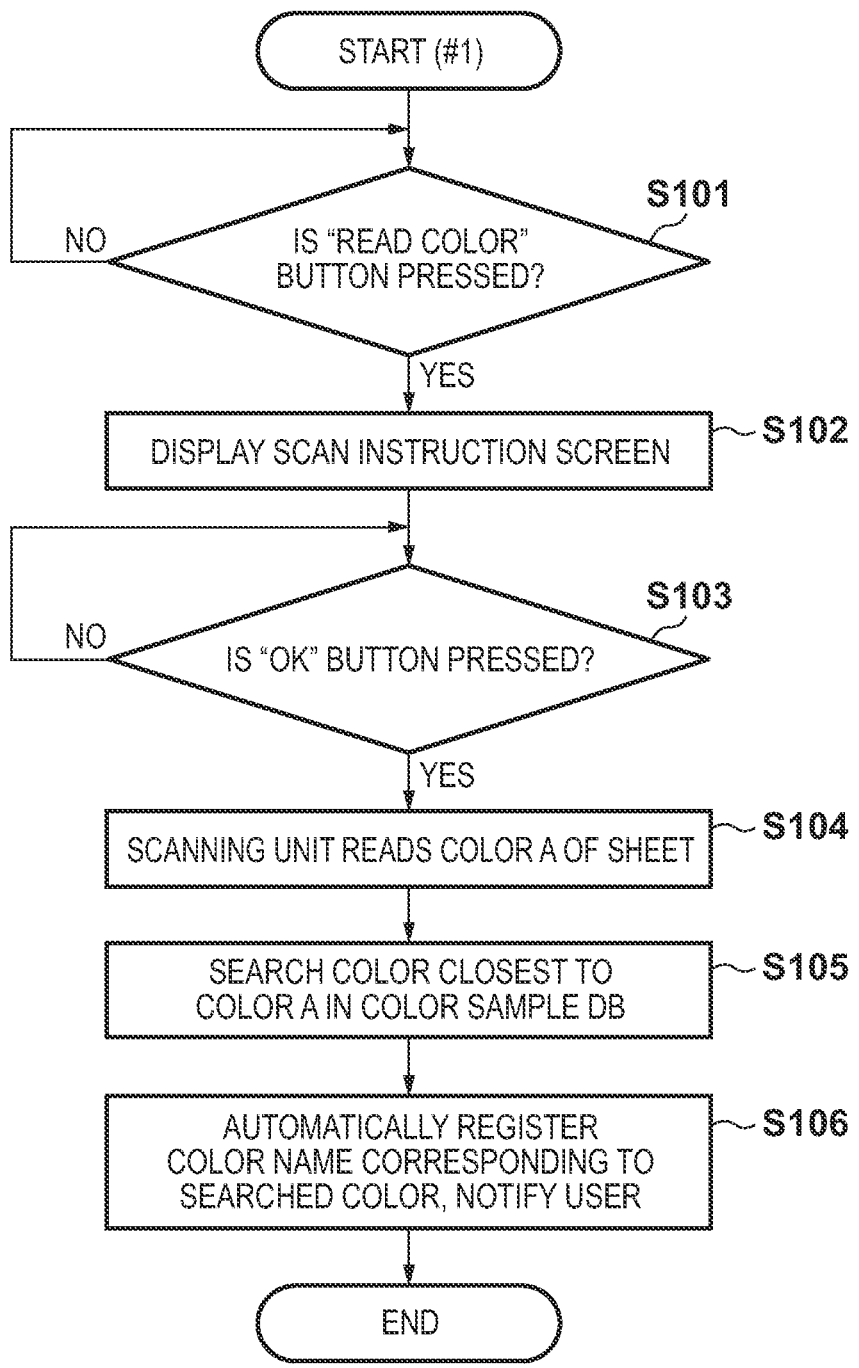
FIG. 11 is a diagram showing a color registration procedure according to a first embodiment.

FIG. 11 is a diagram showing a flowchart of the registration of the color of a sheet according to the present embodiment. Here, a process is explained, in which the color of a sheet is read by the scanning unit 102, the color sample DB stored in the paper-type information storage 103 is searched, and the corresponding color name is registered in the sheet type DB.

Figure 8:
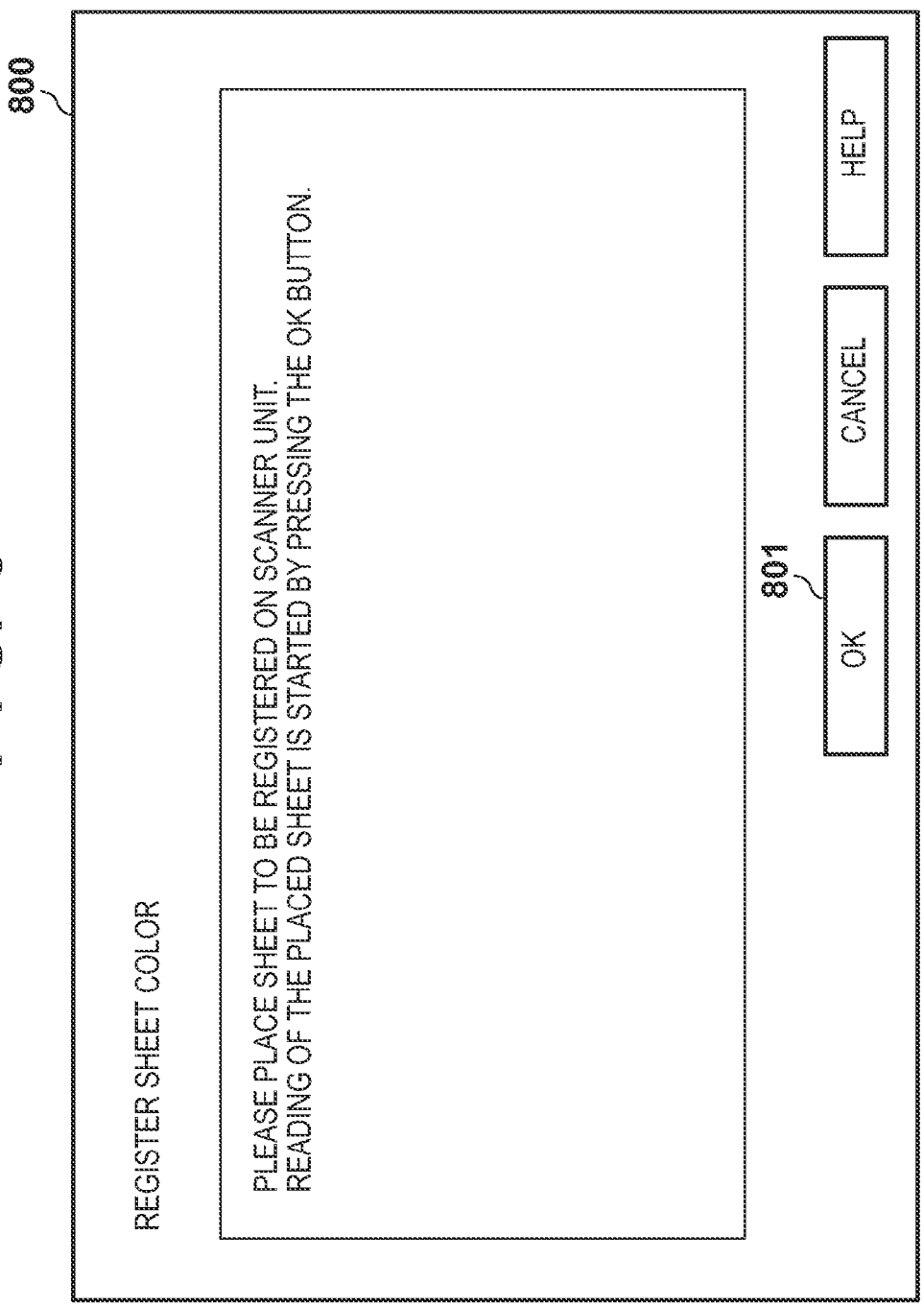
FIG. 8 is a diagram showing a sheet read-in warning screen.

First, when it is sensed that the user has pressed a "read color" button 701 in the details editing screen 700 shown in FIG. 7 (S101), the operation unit 101 displays a sheet scan instruction screen 800 as shown in FIG. 8 (S102). The scan instruction screen 800 is for instructing the scanner unit to start scanning the set sheet, upon a corresponding input by the user.

Then, when it is sensed that the user has pressed an "OK" button 801 (S103), the scanning unit 102 reads in the color from the sheet that is set in the scanner unit, and generates color data (S104). In the present embodiment, the parameters of the L*a*b color system (CIE Lab) are used for the color data. The CIE Lab parameters are constituted by brightness (L), and color hue (ab), and are color data according to an international standard.

Moreover, the control unit 104 searches the color sample DB for the color data that comes closest to the color data read in and generated by the scanning unit 102 (S105). This search process is performed based on a feature amount of the color data (for example the CIE Lab parameters). The color data is constituted by a multitude of colors (about 7000 colors). In this color data, colors that are perceived as different colors by the human eye are treated as different colors. Moreover, the color name corresponding to the color data that has been searched is automatically registered in the sheet type DB (S106). At this time, also the sheet size, the sheet type and the like are registered as well. Moreover, the registered color name etc. is notified (presented) to the user. Here, the notification of the user is performed by displaying with the display of the image forming apparatus.

It should be noted that in the present embodiment, the color name is not one that is assigned arbitrarily by the user, but rather, the color name that is registered in the color sample DB is registered as is in the sheet type DB. Moreover, the color data that is closest to the generated color data is searched in S105, but it is also possible to search the same or similar color data, and let the user select the desired color data from the search results. In this case, the color name corresponding to the color data selected by the user may be registered in the sheet type DB in S106.

After the registration process in S106, the user sets the sheets that have been registered in the sheet type DB in the desired cassette tray. Then, if the user remembers the color name or the like that was notified when registering the searched color name in the sheet type DB, printing is possible, in which the color name is specified using the sheet color parameter 1004 that is displayed on the print setting screen of the driver 108 of the client PCs 106 and 107.

As described above, with the present embodiment, the color data that is closest to the actual color is searched in the color sample DB, and the color name corresponding to the searched color data is automatically registered in the sheet type DB, so that for sheets of different colors, different color names are automatically registered. For example, for light yellow and dark yellow sheets, different color data is respectively searched, so that different color names are automatically registered.

Consequently, since different color names are given to sheets of different colors, it is possible to avoid that sheets of a color not matching the user's intentions are used when printing is performed by the user. For example, it can be avoided that dark yellow sheets are used instead of light yellow sheets. Thus, it is possible of avoid a decrease in print quality.

Second Embodiment

In the first embodiment, the sheets are read by the scanning unit of the image forming apparatus, the color data closest to the read in color is searched in the color sample DB, and the color name corresponding to the searched color data is automatically registered in the sheet type DB. The following process from the user setting sheets with the registered color name for the desired cassette tray up to the printing was explained above. In the present embodiment, an example is explained in which a color name corresponding to the color read by the scanning unit of the image forming apparatus is decided without the use of a color sample DB, and registered in the sheet type DB. It should be noted that for example the configuration of the apparatus is substantially the same as in the first embodiment, so that only differing aspects are explained in the following.

<Color Registration Procedure (FIG. 12)>

Figure 12:
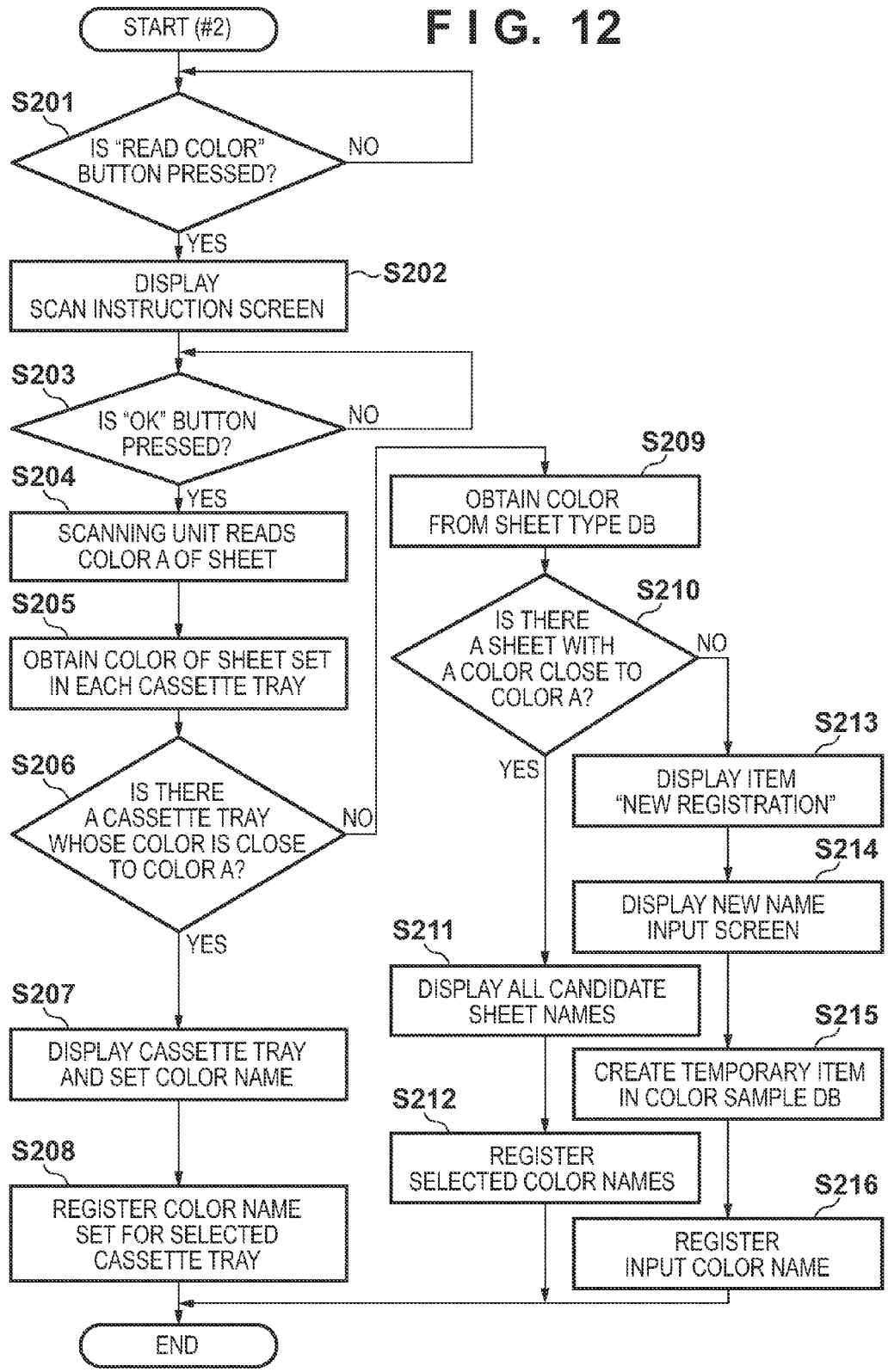
FIG. 12 is a diagram showing a color registration procedure according to a second embodiment.
Figure 13:
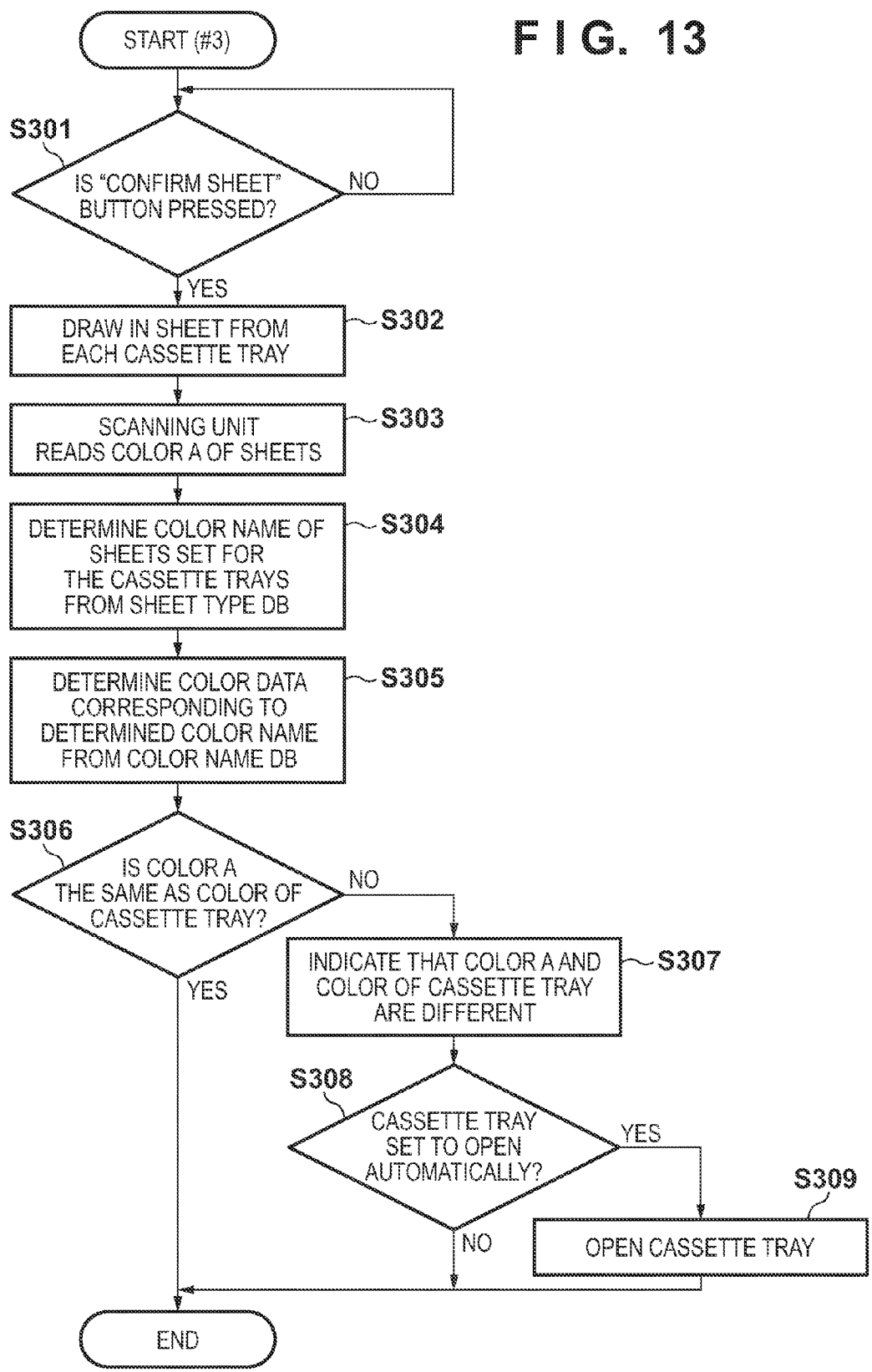
FIG. 13 is a diagram showing a color registration procedure according to a third embodiment.

FIG. 12 shows a flowchart for comparing color data with each other. The processing of S201 to S204 is the same as the processing of S101 to S104 of the first embodiment. Then, when the scanning unit 102 reads in the color data A of a sheet (S204), the control unit 104 obtains the color data A of the sheets to which the cassette trays have been set, which have been read by the scanning unit 102 (S205).

Then, the control unit 104 determines whether there is already a cassette tray that is set to sheets of a color that is close to the read in color data A (S206). For this determination, a color is judged to be close if the parameters L, a and b of the read in color data are within a predetermined range (±2). If there are cassette trays set to sheets of a close color, then the control unit 104 displays the cassette trays and all color names of the sheets to which these cassette trays are set in the list 905 in FIG. 9 (S207).

Figure 9:
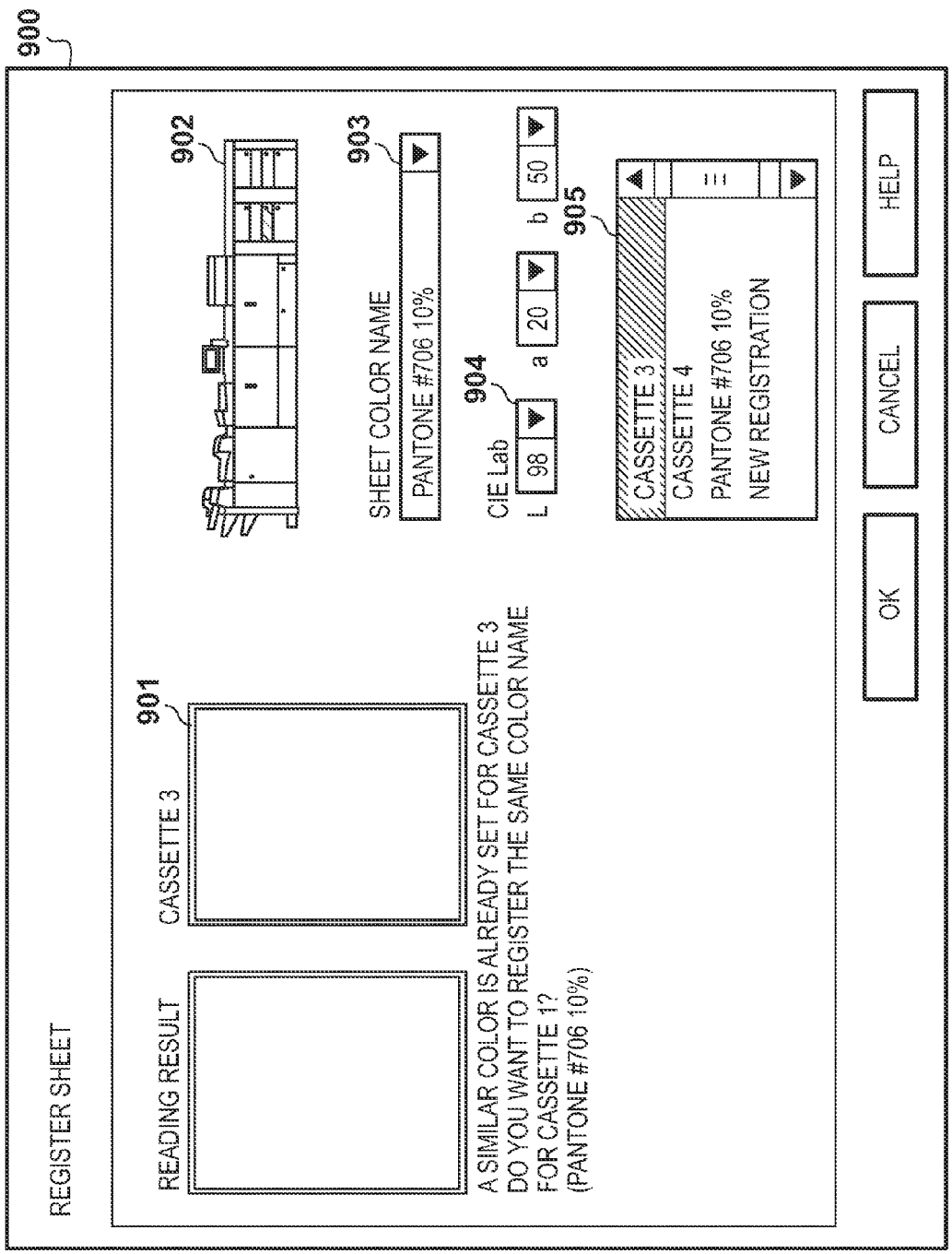
FIG. 9 is a diagram showing a comparison result display screen.

Then, if the user selects any of the cassette trays displayed in the list 905 in FIG. 9, then the control unit 104 lets the operation unit 101 display the color name 903 to which that cassette tray is set, as well as the color data 904 thereof. Moreover, in the device 902 (diagram of the overall device) displayed on the upper right in the screen, it is displayed where in the image forming apparatus the selected cassette tray is located (hatched portion in the drawing). Also, when a candidate color selected from the color sample DB is displayed, the parameters of the color data 904 are also displayed during the selection. Then, if any of the candidate color names is selected, the control unit 104 registers the selected color name in the sheet type DB (S208).

On the other hand, if there is no cassette tray set to sheets of a color that is close to the color data A, then the color data of the sheet type DB is obtained (S209), and it is determined whether the sheet type DB contains data for a color that is close to the read in color data A (S210). If the sheet type DB contains color data that is close to the color data A, then all candidate color names are displayed in the list 905 (S211). Then, the control 104 registers the color name selected by the user in the sheet type DB (S212).

On the other hand, if it is determined in S210 that the sheet type DB does not contain data for a color that is close to the read in color data A, then only the item "new registration" is displayed in the list 905 (S213). Then, when the user selects this item "new registration", a screen for inputting a new color name (not shown) is displayed (S214), and a temporary item is created in the color sample DB (S215) that is deleted when the power is turned off. Then, when the control unit 104 receives an input operation of a new name from the user, this input new name is used and registered in the sheet type DB as a color name for the read in color data A (S216).

With the present embodiment, when a sheet feed cassette is set to sheets of a close color, the user is notified that sheets of a close color are set in another sheet feed cassette, when the sheet feed cassette is newly set to the sheets. Thus, it can be avoided that the user registers sheets of a different color in a cassette tray of the same color name.

Third Embodiment

In the second embodiment, an example was explained, in which the control unit of the image forming apparatus compares the color data of the read in sheet with the color data in the sheet type DB, and if the same color data as the color data of the read in sheet is already registered in the sheet type DB, then a warning is given to the user.

In the present embodiment, sheets that are accommodated in cassette trays of the image forming apparatus are fed at a timing intended by the user, and the color data of the fed sheets is read in for each cassette tray. Then, it is determined whether the read in color data is the same as the color data to which the cassette trays are set. Thus, the user utilizing the image forming apparatus can ascertain at a desired timing whether the color data of the sheets that are actually accommodated in the cassette trays is the same as the color data of the sheets to which the cassette trays are set. For example, even if another user has put sheets of a color that is different from the settings into a certain cassette tray, and has not changed the color settings for this cassette tray, the color of the sheets that are actually accommodated in the cassette tray will be different from the color of the sheets to which the cassette tray is set. This is addressed by the present embodiment, and the following is an explanation of an image forming apparatus, in which it is easy to confirm, for example after the image forming apparatus has been started up, whether the color of the sheets that are actually accommodated in the cassette tray is the same as the color of the sheets to which the cassette tray is set. It should be noted that in the following, an explanation is given only for aspects that are different from the second embodiment.

<Color Registration Procedure (FIG. 14)>

When the user presses the "confirm sheets" button 206 that is provided in the middle of the screen of the operation unit 101 (S301), as shown in FIG. 2, then the control unit 104 draws in a sheet from each cassette tray into the image forming apparatus 100 (S302). Using a spectral unit that is installed at a sheet conveying path inside the apparatus, the scanning unit 102 reads in the color data of the drawn in sheet (S303). The control unit 104 determines the color name of the sheet data to which the cassette tray is set from the sheet type DB (S304). Furthermore, the control unit 104 determines from the color sample DB the color data corresponding to the color names of the cassette trays determined in S304 (S305).

Then, the control unit 104 determines whether the color data read in at S303 is the same as the color data determined at S305 (S306). If they are the same, then the color of the sheets that are actually accommodated in the cassette tray matches the color of the sheets to which the cassette tray is set, and since there is no problem, the control unit 104 concludes the series of processes.

On the other hand, if they differ, then the operation unit 101 presents to the user the fact that the color data read in at S303 differs from the color data determined at S305 (S307). In the present embodiment, this may be displayed in the cassette tray information 202 of FIG. 2. Then, the control unit 104 determines whether the cassette tray is set to open automatically (S308). If it is set to open automatically, the control unit 104 opens the cassette tray (S309). Thus, by confirming the sheets accommodated in the open cassette tray, the user can judge whether the sheets that are actually set in the cassette tray have the right color. On the other hand, if the cassette tray is not set to open automatically, then the cassette tray is not opened automatically, but if the user sees the display of the cassette tray information 202 and opens the cassette tray, then the user can similarly judge whether the color settings for those sheets are correct.

Other Embodiments

In the above-described embodiments, an example has been explained in which, after information on the sheets has been set for the cassette trays, a print job instructs printing by specifying the color name of the sheets used for printing, with a driver of an external PC. However, the present invention is not limited to this, and can also be applied to a copy job. For example, it can also be applied to a case in which, through the operation unit 101 of the image forming apparatus 100, the user specifies the color name of the sheets used for printing, and printing is instructed. In this case, the image forming apparatus 100 may display with the operation unit 101 other screens instead of the screens shown in FIGS. 2 to 10 to receive from instructions the user.

With the present invention, it can be prevented that the printing result desired by the user is not output due to the user registering the same color name for sheets of different colors.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-245704 filed on Nov. 1, 2010, which is hereby incorporated by reference herein in its entirety.

What is claimed is:

1. An image forming apparatus comprising:
    a reading unit that reads a sheet to be placed on a sheet feed cassette;
    a determining unit that determines whether or not there is already another sheet feed cassette that is set to a color name corresponding to color data that is close to color data indicating a color of the sheet read by the reading unit;
    a comparing unit that compares the color data indicating the color of the sheet read by the reading unit with color data stored in a color sample database in a case where the determining unit has determined that there is no other sheet feed cassette, wherein the color sample database stores the color data, which represents a density of each of a plurality of colors in the L*a*b color system or the RGB color system;
    an obtaining unit that obtains a color name corresponding to color data indicating a color of the sheet read by the reading unit based on a comparing result from the comparing unit, wherein the color name corresponding to the color data is stored in the color sample database;
    a setting unit that sets the color name set to the another sheet feed cassette on which the sheet is placed in a case where the determining unit has determined that there is already another sheet feed cassette, and sets the color name obtained by the obtaining unit to the sheet feed cassette on which the sheet is placed in a case where the determining unit has determined that there is no other sheet feed cassette;

a receiving unit that receives a print job designating a color of the sheet on which an image is formed; and an image forming unit that forms the image on the sheet placed on the sheet feed cassette to which the color name corresponding to the color designated in the print job received by the receiving unit is set.

2. The image forming apparatus according to claim 1, further comprising a registration unit that registers the sheet read by the reading unit together with the color name obtained by the obtaining unit in a sheet type database, wherein the setting unit sets the feed sheet cassette to a selected color name in response to a user selecting a color name from the color names registered in the sheet type database.

3. The image forming apparatus according to claim 2, wherein the sheet type database comprehensively manages for each sheet using at least one of the color data, the color name corresponding to the color data, or the settings necessary for printing, including type and size of the sheet.

4. The image forming apparatus according to claim 3, wherein the setting unit sets the feed sheet cassette to the color data, the color name, and the settings necessary for printing, of the sheet corresponding to the color name selected by the user from color names registered in the sheet type database.

5. The image forming apparatus according to claim 1, further comprising a printing unit that, in response to a user giving a print instruction including specification of a sheet feed cassette in which sheets corresponding to the color name are set, performs printing using sheets accommodated in the specified sheet feed cassette.

6. A control method for controlling an image forming apparatus, the method comprising:

reading a sheet to be placed on a sheet feed cassette;

determining whether or not there is already another sheet feed cassette that is set to a color name corresponding to color data that is close to color data indicating a color of the read sheet;

comparing the color data indicating the color of the read sheet with color data stored in a color sample database in a case where it is determined that there is no other sheet feed cassette, wherein the color sample database stores the color data, which represents a density of each of a plurality of colors in the L*a*b color system or the RGB color system;

obtaining a color name corresponding to color data indicating a color of the read sheet based on a comparing result from the comparing step, wherein the color name corresponding to the color data is stored in the color sample database;

setting the color name set to the another sheet feed cassette on which the sheet is placed in a case where it is determined that there is already another sheet feed cassette;

setting the color name obtained in the obtaining step to the sheet feed cassette on which the sheet is placed in a case where it is determined that there is no other sheet feed cassette;

receiving a print job designating a color of the sheet on which an image is formed; and forming the image on the sheet placed on the sheet feed cassette to which the color name corresponding to the color designated in the print job received in the receiving step is set.

7. A non-transitory computer-readable storage medium storing a computer program that causes a computer to function as units of an image forming apparatus comprising:

a reading unit that reads a sheet to be placed on a sheet feed cassette;

a determining unit for determining whether or not there is already another sheet feed cassette that is set to a color name corresponding to color data that is close to color data indicating a color of the read sheet;

a comparison unit for comparing the color data indicating the color of the read sheet with color data stored in a color sample database in a case where the determining unit has determined that there is no other sheet feed cassette, wherein the color sample database stores the color data, which represents a density of each of a plurality of colors in the L*a*b color system or the RGB color system;

an obtaining unit that obtains a color name corresponding to color data indicating a color of the sheet read by the reading unit based on a comparing result from the comparison unit, wherein the color name corresponding to the color data is stored in the color sample database;

a setting unit that sets the color name set to the another sheet feed cassette on which the sheet is placed in a case where determining unit has determined that there is already another sheet feed cassette and sets the color name obtained by the obtaining unit to the sheet feed cassette on which the sheet is placed in a case where the determining unit has determined that there is no other sheet feed cassette;

a receiving unit that receives a print job designating a color of the sheet on which an image is formed; and an image forming unit that forms the image on the sheet placed on the sheet feed cassette to which the color name corresponding to the color designated in the print job received by the receiving unit is set.

* * * * *